United States Patent
Major et al.

(10) Patent No.: US 7,713,022 B2
(45) Date of Patent: May 11, 2010

(54) SMALL RADIAL PROFILE SHROUD FOR VARIABLE VANE STRUCTURE IN A GAS TURBINE ENGINE

(75) Inventors: Daniel W. Major, Middletown, CT (US); Edward Torres, Middletown, CT (US); Joseph C. Burge, Jupiter, FL (US)

(73) Assignee: United Technologies Operations, Hartford, CT (US)

( * ) Notice: Subject to any disclaimer, the term of this patent is extended or adjusted under 35 U.S.C. 154(b) by 612 days.

(21) Appl. No.: 11/682,358

(22) Filed: Mar. 6, 2007

(65) Prior Publication Data

US 2008/0219832 A1    Sep. 11, 2008

(51) Int. Cl.
*F01D 9/04* (2006.01)
*F01D 17/16* (2006.01)

(52) U.S. Cl. .................. 415/160; 415/209.3; 29/889.22; 416/214 A

(58) Field of Classification Search .............. 415/209.3, 415/209.2, 160, 159, 191; 29/889.22; 416/214 A, 416/214 R
See application file for complete search history.

(56) References Cited

U.S. PATENT DOCUMENTS

| | | | |
|---|---|---|---|
| 3,318,513 A * | 5/1967 | Johnson | ...................... 415/161 |
| 4,053,256 A | 10/1977 | Hertel | |
| 4,245,954 A | 1/1981 | Glenn | |
| 4,792,277 A | 12/1988 | Dittberner | |
| 5,061,152 A * | 10/1991 | Marey | ......................... 415/159 |
| 5,062,767 A * | 11/1991 | Worley et al. | ............. 415/209.3 |
| 5,190,439 A | 3/1993 | Das | |
| 5,609,466 A | 3/1997 | North | |
| 5,622,473 A | 4/1997 | Payling | |
| 6,129,512 A | 10/2000 | Agram | |
| 6,474,941 B2 | 11/2002 | Dingwell | |
| 6,682,299 B2 | 1/2004 | Bowen | |
| 6,790,000 B2 * | 9/2004 | Wolf | ........................ 415/209.2 |
| 6,843,638 B2 | 1/2005 | Hidalgo | |
| 7,125,222 B2 | 10/2006 | Cormier | |
| 2007/0020093 A1 * | 1/2007 | Giaimo et al. | .............. 415/160 |

* cited by examiner

*Primary Examiner*—Richard Edgar
(74) *Attorney, Agent, or Firm*—Carlson, Gaskey & Olds PC

(57) ABSTRACT

A shroud for supporting a variable vane in a compressor section for a gas turbine engine includes a pair of components which are secured together by a threaded fastener extending into a blind hole in one of the two components. Additional material forms on the component which includes the blind hole extends beyond a pivot axis for the vane such that there is an increased length of engagement between the threaded fastener and the blind hole. The blind hole eliminates the need for multiple nuts and reduces the radial height of the shroud to save additional weight.

18 Claims, 6 Drawing Sheets

SMALL RADIAL PROFILE SHROUD FOR VARIABLE VANE STRUCTURE IN A GAS TURBINE ENGINE

BACKGROUND OF THE INVENTION

This application relates to a shroud for a variable vane structure in a gas turbine engine, wherein the shroud is formed of two components connected together by a threaded fastener extending into a blind hole in one of the two components.

Gas turbine engines are known, and have a plurality of sections. Typically, a compressor section receives air and compresses that air. The air is delivered downstream to a combustor, and is mixed with fuel. The air and fuel is combusted, and the products of combustion are passed downstream over turbine rotors. The turbine rotors are driven to rotate.

The compressor section typically includes a plurality of rotor stages and intermediate stationary vane stages. The rotor stages each include a plurality of blades which have airfoils to receive and compress air, and deliver that air downstream. Intermediate each stage of rotor blades are stationary vanes. Under certain conditions it is desirable to redirect the airflow between the compression stages. Thus, the vanes have a variable profile, and may be caused to rotate on a pivot axis to control the direction of air from one compression stage as it approaches the next compression stage.

Such variable vanes are mounted in inner and outer shrouds. In the prior art, at least some of these shrouds have been formed of at least two separate components which meet along a flat mating surface at the pivot axis of the vane. This prior art structure has included a hole extending through both components. A threaded fastener, such as a bolt, extends through the hole, and a nut is secured at an opposed end of the hole. This structure requires a relatively great radial profile for the shroud, due to the nut.

SUMMARY OF THE INVENTION

In a disclosed embodiment of this invention, the shroud for a variable vane is formed of two components. A threaded fastener extends through a hole in one of the components, and into a blind hole in the other. The use of the blind hole provides a much smaller radial envelope for the combined shroud and eliminates the need for multiple nuts to save additional weight. In one feature of the disclosed embodiment, the component which includes the blind hole has at least a portion extending beyond the pivot axis for the vane such that there is a good deal of additional material to receive the blind hole.

These and other features of the present invention can be best understood from the following specification and drawings, the following of which is a brief description.

DETAILED DESCRIPTION OF THE PREFERRED EMBODIMENT

Figure 1:
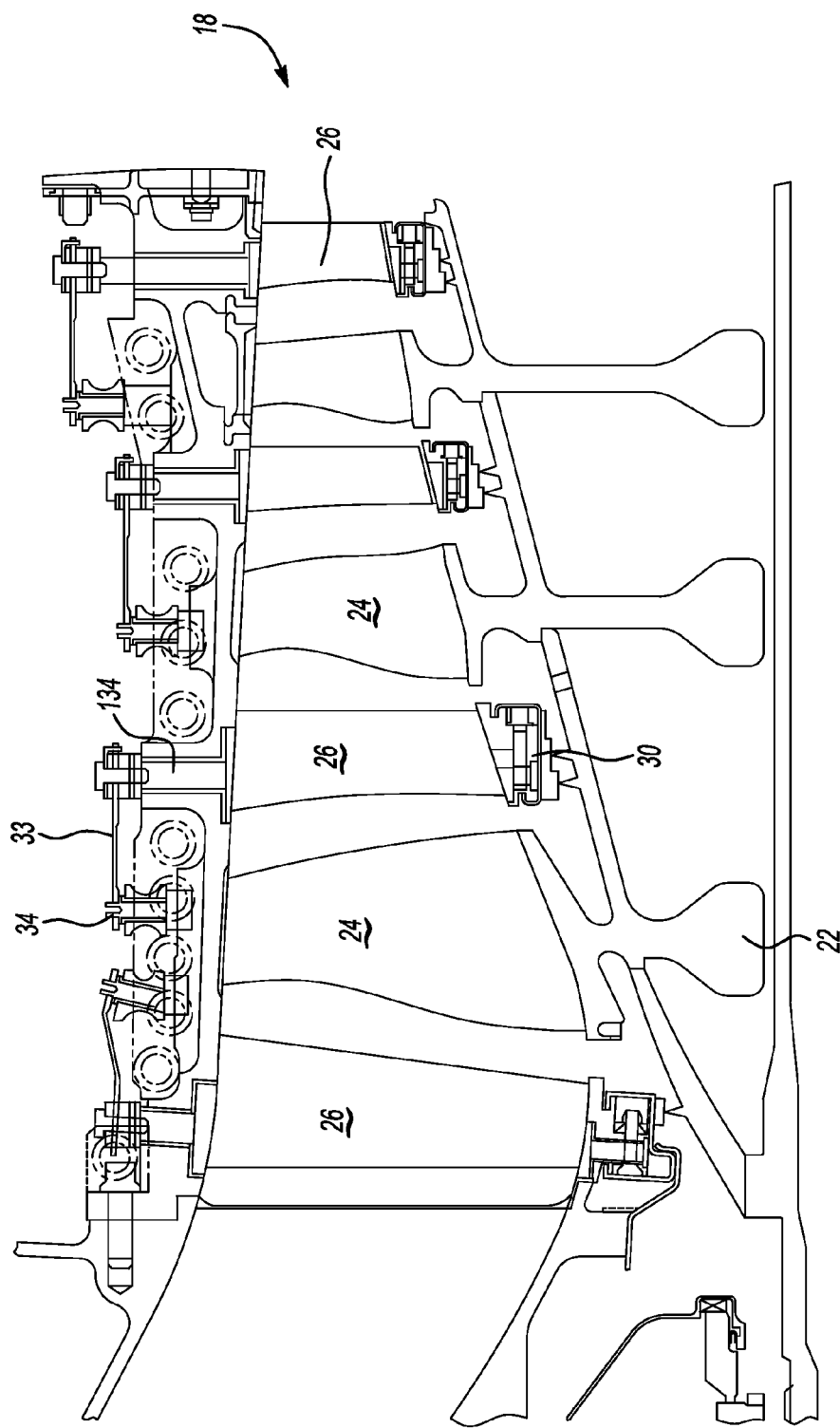
FIG. 1 is a view of a compressor section for a gas turbine engine.

A compressor section 18 for a gas turbine engine is illustrated in FIG. 1. The compressor section 18 has components which rotate about a center axis 20. As known, rotors 22 are driven to rotate, and carry blades 24. The blades have airfoils, and intermediate the stages of rotors 22 are positioned stationary vanes 26. The vanes direct the airflow from one compressor stage to the next.

As known, a shroud 30 secures an inner peripheral portion of the vane 26, and supports it for pivotal movement. An outer trunnion 134 of the vane 26 is driven to pivot by a linkage 33 connected to an actuator 34. As is known, the vane 26 is a variable vane, and can be caused to pivot based upon operational conditions to control the direction of air delivered from one compressor stage to the downstream compressor stage. The times when such pivotal movement is desirable are within the level or ordinary skill in the art. This application relates to the inner shroud arrangement, and not to the movement of the vane 26 itself.

Figure 2:
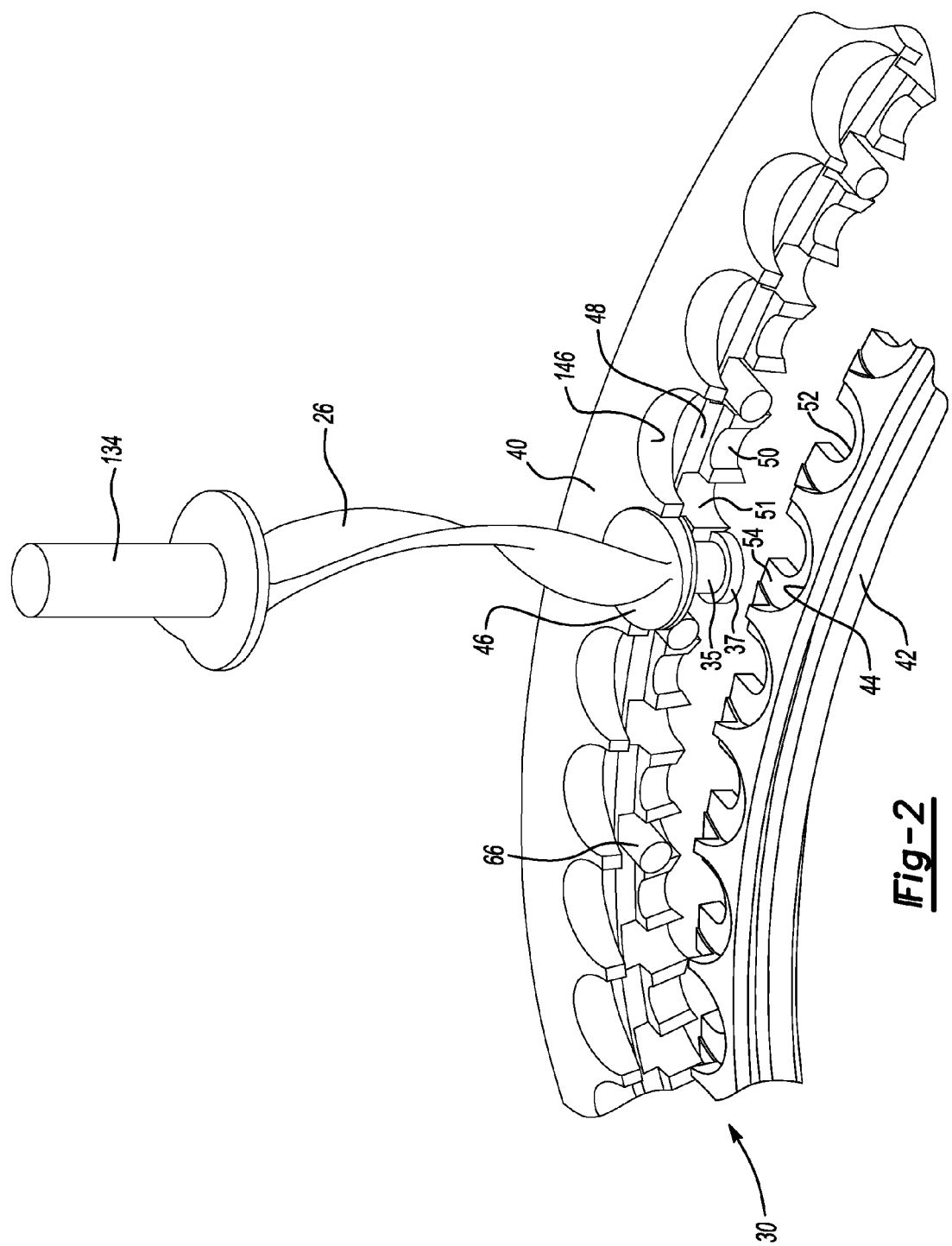
FIG. 2 shows an exploded view of a variable vane and its inner shroud structure.

As shown in FIG. 2, the vane 26 has the radially outer trunnion 134, and a radially inner platform 46, having a radially inner trunnion 35 which will be received within support structure in the inner shroud 30. An upstream component 42 of the inner shroud 30 has a support surface 44 which is part-cylindrical, and conforms to the platform 46 of the vane 26. A downstream component 40 of the shroud 30 includes a similar part cylindrical surface 146. Radially inner support surfaces 50 and 52 support the inner trunnion 35. A forwardly extending portion 54 will extend beyond a pivot axis of the vane 26 as will be explained below. The portions 54 fit into slots 51 which are circumferentially spaced between support portions 50 on the component 40. A flat surface 48 serves to allow component 42 material to extend beyond the pivot axis and prevent rotation of a bearing (see FIG. 7). Although not shown, both components 40 and 42 extend for 360° about axis 20. In other embodiments, multiple circumferential segments, such as 90°, may be used.

Figure 3:
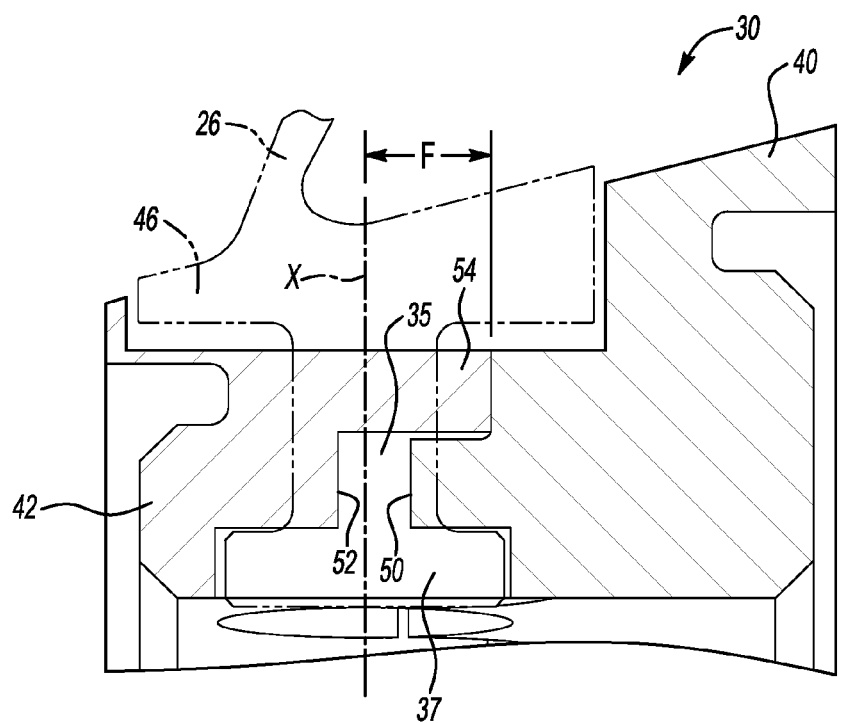
FIG. 3 is a cross-sectional view through an assembly of the inner shroud.

FIG. 3 is a cross-sectional view through the shroud 30 and shows the relationship between components 40 and 42. As can be seen, the component 42 has portion 54 extending across the pivot axis X of the vane 26. As further shown, the surfaces 50 and 52 support the lower trunnion 35. A lowermost surface 37 is also supported between the components 40 and 42.

Figure 4:
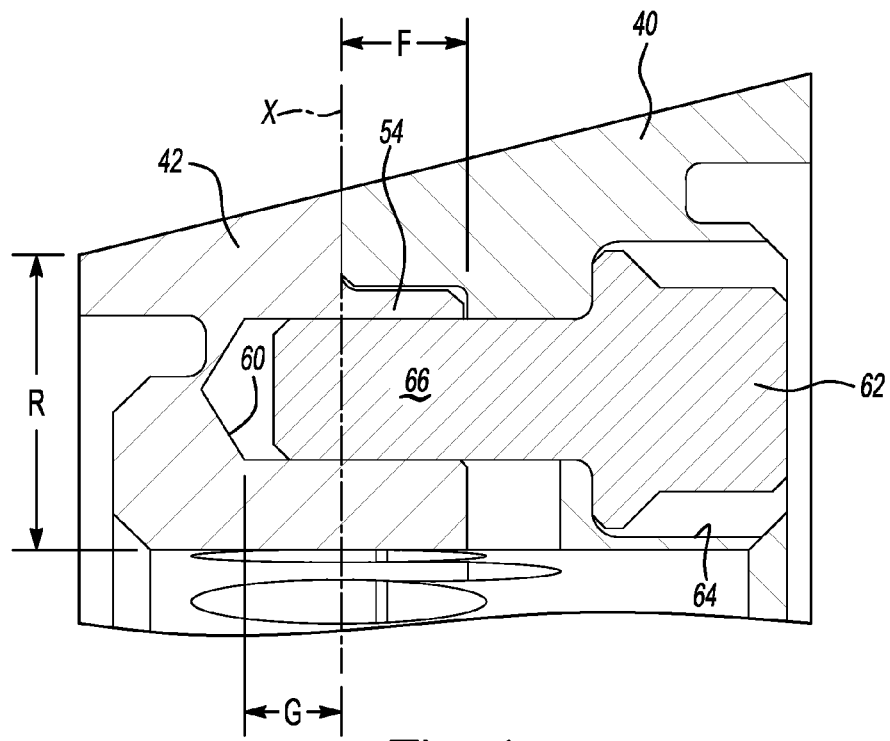
FIG. 4 is a cross-sectional view along a distinct portion of the shroud of FIG. 2.

As shown in FIG. 4, this extending portion 54 provides additional material to receive a threaded blind hole 60. A bolt 62 can be driven into a recess 64 in the component 40 and into the blind hole 60 such that a threaded element 66 can be secured into the blind hole 60 and secure components 40 and 42 about the vanes 26. The additional material from portion 54 provides a stronger component 42 and provides a greater distance of threaded connection than would be available without the additional material from portion 54. As can be seen, the threaded distance includes the total of both distance F and distance G. The prior art required a greater radial envelope R to provide its nut connection than is required by this embodiment utilizing the blind hole 60.

Figure 5:
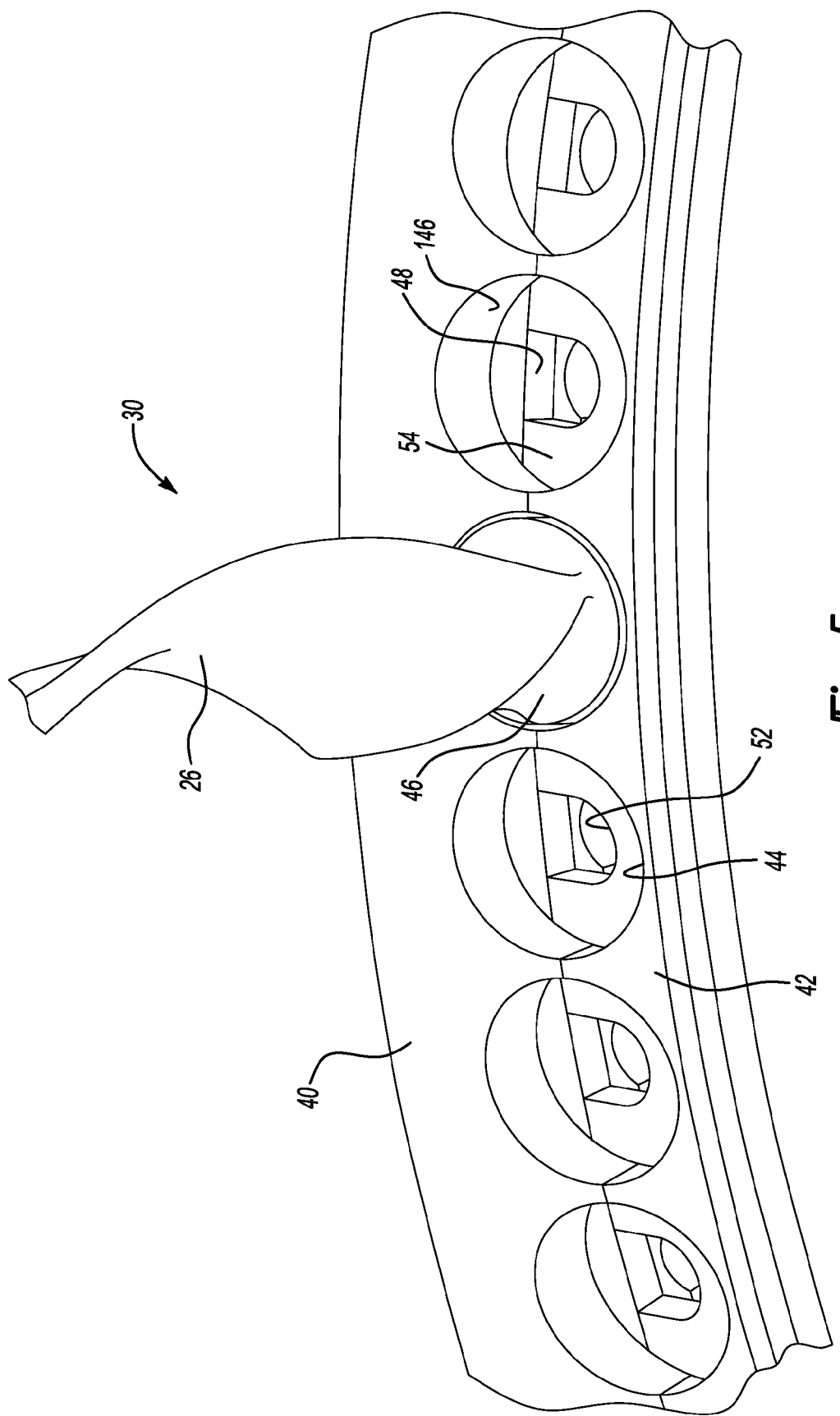
FIG. 5 is an assembled view of the shroud.

FIG. 5 shows an assembled view. Platform 46 conforms to surfaces 44 and 146 for unrestricted flow. As can be seen in this figure, there are a plurality of circumferentially spaced locations which will each receive a vane 26, even though they are not all illustrated in this figure.

Figure 6:
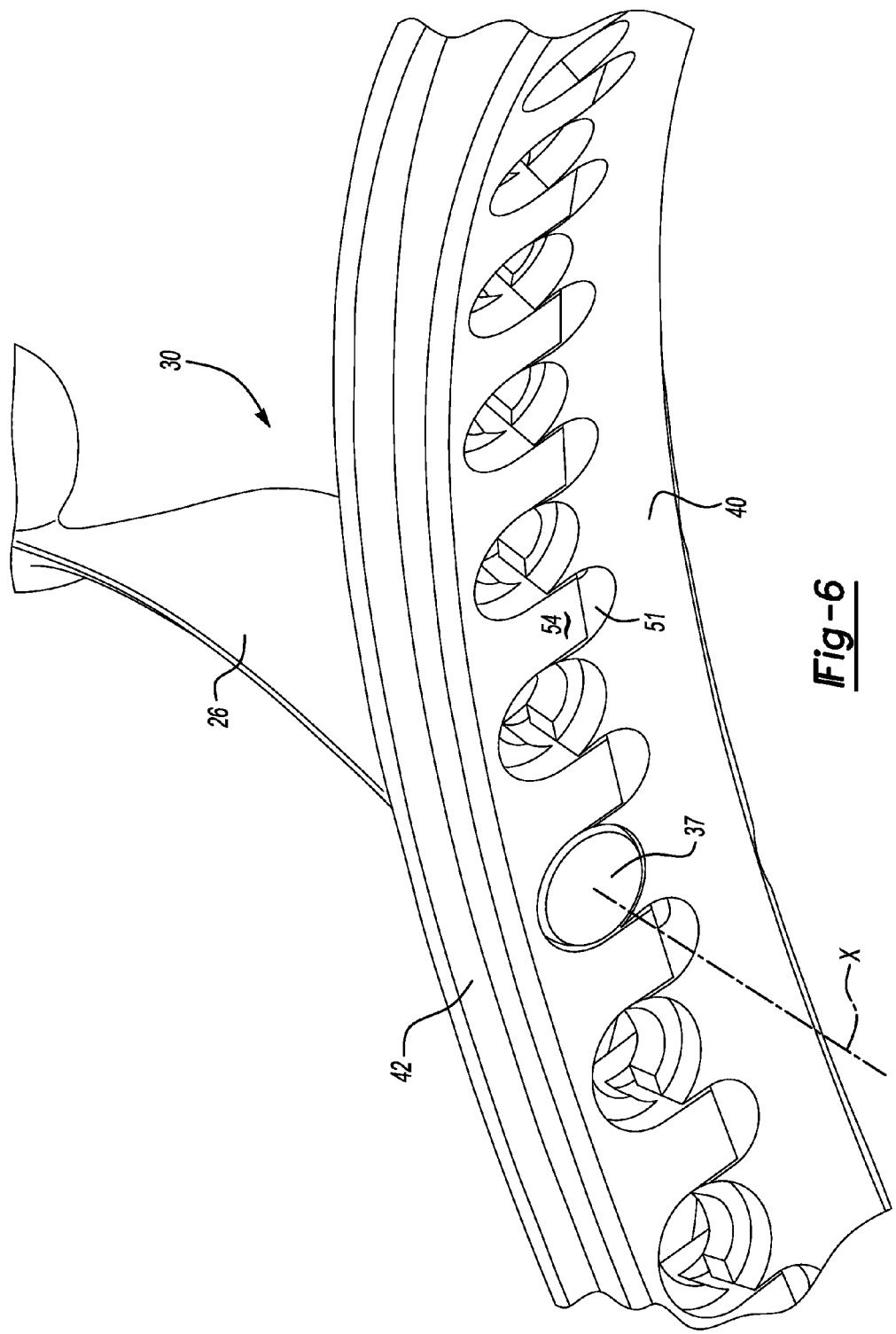
FIG. 6 is a radially inner view of the shroud shown in FIG. 5.

FIG. 6 shows a radially inner view of the shroud 30. The extending portions 54 extend axially beyond the pivot axis X for the vanes 26, and into slots 51. The vanes 26 are supported at locations circumferentially spaced between the slots 51 and the extending portions 54.

Figure 7:
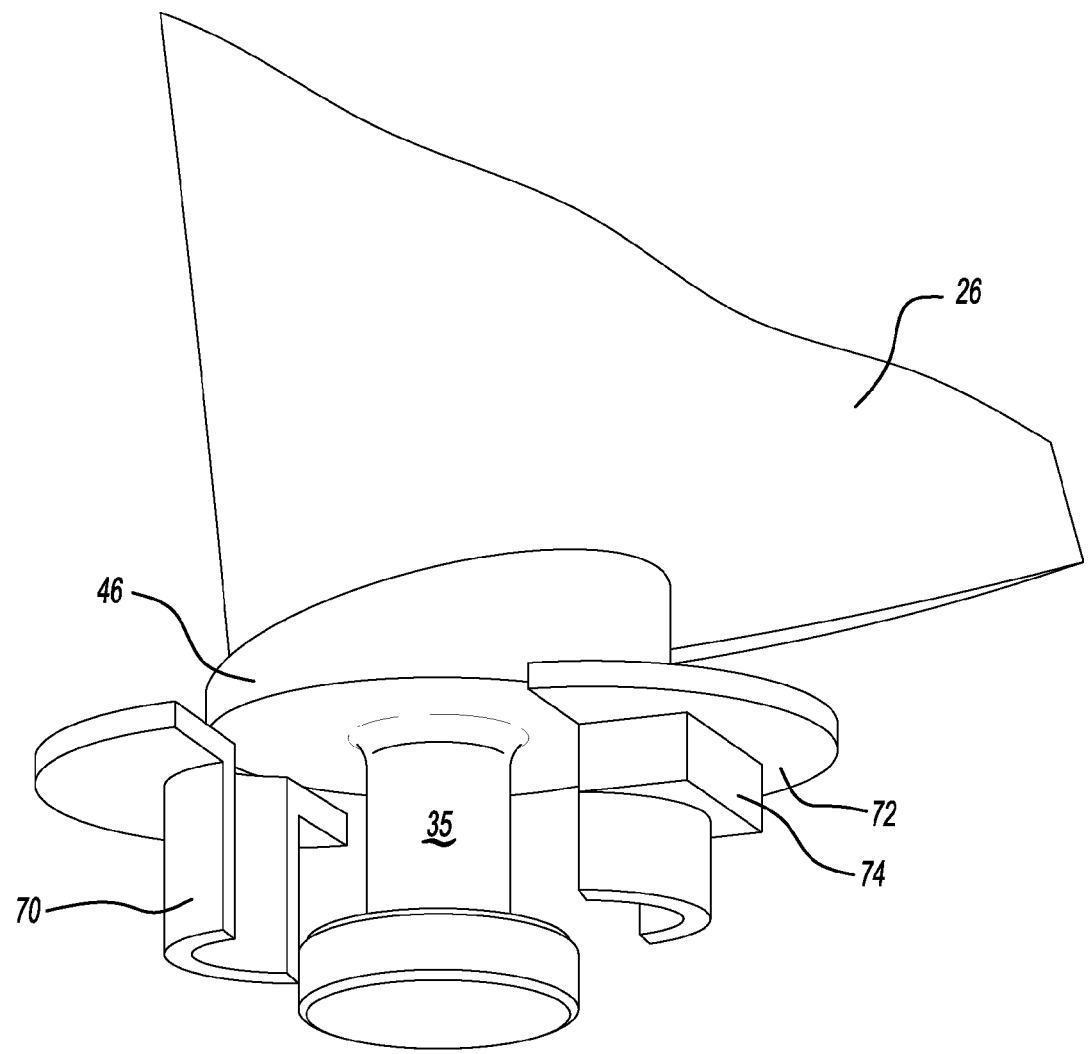
FIG. 7 shows an inner bearing feature.

FIG. 7 shows a split bearing assembly 70 and 72 which is mounted about the trunnion 35, and which is the portion actually supported between the surfaces 50 and 52, although not illustrated in the FIGS. 1-6. As can be seen, one of the bearing portions has a flat 74. Flat 74 sits against flat surface 48 preventing rotation of the bearing as the vane 26 rotates about axis X.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A shroud for supporting a variable vane in a compressor for a gas turbine engine comprising:

at least two components extending circumferentially, to support a radially inner trunnion on a variable vane and said at least two components being connected by a threaded fastener member extending through a hole in a first of said at least two components and into a blind hole in a second of said at least two components and wherein one of said components has additional material extending therefrom that is adapted to engage said threaded fastener and wherein said additional material is disposed within a slot within said other component.

2. The shroud as set forth in claim 1, wherein there are only two of said components, and each of said two components extend circumferentially for 360° about a central axis.

3. The shroud as set forth in claim 1, wherein there is an upstream component and a downstream component, and said second component is said upstream component.

4. The shroud as set forth in claim 1, wherein said both components having a support surface for supporting the inner trunnion, with said second component having said additional material for extending beyond a pivot axis of the variable vane, said additional material including said blind hole to increase a threaded securement length of said threaded fastener within said blind hole.

5. The shroud as set forth in claim 4, wherein said additional material extends from locations circumferentially spaced between the support positions for mounting the inner trunnion, and into said slots in said first component.

6. The shroud as set forth in claim 4, wherein a bearing is mounted between the inner trunnion and support surfaces.

7. The shroud as set forth in claim 6, wherein an anti-rotation surface is formed on one of said at least two components, and said bearing having structure for engaging said anti-rotation surface.

8. The shroud as set forth in claim 7, wherein said bearing is formed of two separate parts, and at least one of said parts having a flat surface, said anti-rotation surface also being flat, and said flat surfaces being aligned with each other to prevent rotation of said bearing relative to support surfaces.

9. The shroud as set forth in claim 4, wherein each of said components having a radially outer support surface for supporting a radially outer portion of an inner peg, and a radially inner support surface for supporting a radially inner portion of the inner trunnion, and said additional material extending circumferentially between said radially inner support surfaces.

10. A compressor section for use in a gas turbine comprising:

a plurality of rotors for rotation about an axial center line and at least one variable vane assembly positioned axially intermediate said plurality of rotor stages; and an inner shroud for mounting a radially inner portion of a variable vane in said variable vane assembly, and an actuator mechanism for causing said variable vane to pivot about a pivot axis, said inner shroud including at least two components extending circumferentially, to support a radially inner trunnion on said variable vane and said at least two components being connected by a threaded fastener member extending though a hole in a first of said at least two components and into a blind hole in a second of said at least two components and wherein one of said components has additional material extending therefrom that is adapted to engage said threaded fastener and wherein said additional material is disposed within a slot within said other component.

11. The compressor section as set forth in claim 10, wherein there are only two of said components, and each of said two components extend circumferentially for 360° about said axis.

12. The compressor section as set forth in claim 10, wherein there is an upstream component and a downstream component, and said second component is said upstream component.

13. The compressor section as set forth in claim 10, wherein said components both having a support surface for supporting said radially inner trunnion with said second component having said additional material extending beyond the pivot axis, said additional material including said blind hole to increase a threaded securement length of said threaded fastener within said blind hole.

14. The compressor section as set forth in claim 13, wherein said additional material extends from locations circumferentially spaced between the support positions for mounting said inner trunnion, and into said slots in said first component.

15. The compressor section as set forth in claim 13, wherein a bearing is mounted between said inner trunnion and said support surfaces.

16. The compressor section as set forth in claim 15, wherein an anti-rotation surface is formed on one of said at least two components, and said bearing having structure for engaging said anti-rotation surface.

17. The compressor section as set forth in claim 16, wherein said bearing is formed of two separate parts, and at least one of said parts having a flat surface, said anti-rotation surface also being flat, and said flat surfaces being aligned with each other to prevent rotation of said bearing relative to said support surfaces.

18. The compressor as set forth in claim 13, wherein each of said components having a radially outer support surface for supporting a radially outer portion of said inner trunnion, and a radially inner support surface for supporting a radially inner portion of said inner trunnion, and said additional material extending circumferentially between said radially inner support surfaces.

\* \* \* \* \*

UNITED STATES PATENT AND TRADEMARK OFFICE
CERTIFICATE OF CORRECTION

PATENT NO. : 7,713,022 B2  Page 1 of 1
APPLICATION NO. : 11/682358
DATED : May 11, 2010
INVENTOR(S) : Major et al.

It is certified that error appears in the above-identified patent and that said Letters Patent is hereby corrected as shown below:

Title page should read

Item (73) Assignee: United Technologies Corporation, Hartford, CT (US)

Signed and Sealed this

Third Day of August, 2010

David J. Kappos
*Director of the United States Patent and Trademark Office*